(12) United States Patent
Li et al.

(10) Patent No.: US 10,526,008 B1
(45) Date of Patent: Jan. 7, 2020

(54) MACHINE CURRENT LIMITING FOR PERMANENT MAGNET SYNCHRONOUS MACHINES

(71) Applicant: STEERING SOLUTIONS IP HOLDING CORPORATION, Saginaw, MI (US)

(72) Inventors: Haibo Li, Saginaw, MI (US); Prerit Pramod, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/049,921

(22) Filed: Jul. 31, 2018

(51) Int. Cl.
| | |
|---|---|
| *H02P 7/00* | (2016.01) |
| *B62D 5/04* | (2006.01) |
| *H02P 21/22* | (2016.01) |
| *H02P 6/08* | (2016.01) |
| *H02P 25/022* | (2016.01) |

(52) U.S. Cl.
CPC ......... *B62D 5/0463* (2013.01); *B62D 5/0481* (2013.01); *H02P 6/08* (2013.01); *H02P 21/22* (2016.02); *B60L 2240/423* (2013.01); *H02P 25/022* (2013.01)

(58) Field of Classification Search
CPC .............................. B62D 5/0463; H02P 21/22
USPC ......................................................... 318/432
See application file for complete search history.

(56) References Cited

U.S. PATENT DOCUMENTS

| | | | |
|---|---|---|---|
| 8,018,185 B2 | 9/2011 | Yamamoto et al. | |
| 8,154,228 B2 | 4/2012 | Yundt et al. | |
| 8,723,461 B2 * | 5/2014 | Yoo | H02P 21/06 318/400.02 |
| 8,744,794 B2 | 6/2014 | Wu et al. | |
| 9,369,078 B2 | 6/2016 | Gebregergis et al. | |
| 9,461,574 B2 | 10/2016 | Gebregergis et al. | |
| 9,531,311 B2 | 12/2016 | Collier-Hallman | |
| 2005/0057208 A1 | 3/2005 | Seibel et al. | |
| 2006/0132074 A1 | 6/2006 | Yang et al. | |
| 2007/0205743 A1* | 9/2007 | Takahashi | H02M 7/53875 318/807 |

(Continued)

FOREIGN PATENT DOCUMENTS

| | | |
|---|---|---|
| CN | 1138234 A | 12/1996 |
| CN | 1754305 A | 3/2006 |

(Continued)

OTHER PUBLICATIONS

Chinese First Office Action and Search Report dated Dec. 30, 2015 cited in Application No. 201410089156.1, 9 pgs.

(Continued)

*Primary Examiner* — Erick D Glass

(57) ABSTRACT

Technical solutions are described for applying machine current limiting in permanent magnet synchronous motors. An example system includes a PMSM and a motor control system. The motor control system is configured to receive a torque command and determine whether the torque command can be satisfied based on a given voltage and a given maximum motor current limit. The motor control system is further configured to, responsive to determining that the torque command can be satisfied, determine a minimum current that satisfies the torque command. The motor control system is further configured to send the minimum current as a minimum current command to the PMSM.

17 Claims, 9 Drawing Sheets

(56) References Cited

U.S. PATENT DOCUMENTS

| | | | |
|---|---|---|---|
| 2008/0030163 A1* | 2/2008 | Fukuchi | H02P 21/22 318/801 |
| 2009/0059446 A1 | 3/2009 | Matsui et al. | |
| 2009/0295316 A1 | 12/2009 | Patel et al. | |
| 2010/0219780 A1 | 9/2010 | Morimoto et al. | |
| 2010/0264860 A1 | 10/2010 | Jun et al. | |
| 2010/0277111 A1* | 11/2010 | Kitanaka | H02P 21/06 318/400.02 |
| 2011/0043149 A1 | 2/2011 | Kitanaka | |
| 2011/0148335 A1 | 6/2011 | Harakawa et al. | |
| 2011/0175558 A1 | 7/2011 | Kitanaka | |
| 2011/0241578 A1 | 10/2011 | Kim et al. | |
| 2012/0221280 A1 | 8/2012 | Wu et al. | |
| 2014/0253000 A1 | 9/2014 | Gebregergis et al. | |
| 2014/0265951 A1 | 9/2014 | Gebregergis et al. | |
| 2014/0265953 A1 | 9/2014 | Collier-Hallman | |
| 2015/0236632 A1* | 8/2015 | Marohl | H02P 21/22 318/722 |

FOREIGN PATENT DOCUMENTS

| | | |
|---|---|---|
| CN | 101479925 A | 7/2009 |
| CN | 101507101 A | 8/2009 |
| CN | 101902185 A | 12/2010 |
| CN | 102208890 A | 10/2011 |
| CN | 102545766 A | 7/2012 |
| CN | 102594250 A | 7/2012 |
| CN | 102694498 A | 9/2012 |
| EP | 1115196 A2 | 7/2001 |
| JP | H1198891 A | 4/1999 |
| JP | 2000037098 A | 2/2000 |
| JP | 2004056839 A | 2/2004 |
| JP | 4657215 B2 | 3/2011 |

OTHER PUBLICATIONS

Chinese First Office Action and Search Report dated Dec. 31, 2015 cited in Application No. 201410145809.3, 10 pgs.

Chinese First Office Action and Search Report dated Feb. 2, 2016 cited in Application No. 201410092806.8, 9 pgs.

Chinese Second Office Action dated Sep. 13, 2016 cited in Application No. 201410145809.3, 9 pgs.

EP Extended Search Report dated Aug. 1, 2017 cited in Application No. 14158574.5, 7 pgs.

EP Extended Search Report dated Aug. 1, 2017 cited in Application No. 14158865.7, 8 pgs.

EP Search Report dated Mar. 5, 2015 cited in Application No. 14158557.0, 4 pgs.

* cited by examiner

MACHINE CURRENT LIMITING FOR PERMANENT MAGNET SYNCHRONOUS MACHINES

BACKGROUND

The present application is generally related to machine current limiting for permanent magnet synchronous machines for electric power steering systems.

Permanent Magnet Synchronous Machines (PMSMs) are widely used in electric drive applications owing to their high power density, superior control performance and reliability. Typically, torque control of PMSMs is performed indirectly through feedback current control typically utilizing current and position measurements. Field Oriented Control (FOC) is the most commonly used technique for current control, in which all AC signals are transformed into DC signals via a reference frame transformation. The control system is then implemented in the synchronously rotating or d/q reference frame.

SUMMARY

According to one or more embodiments, a system includes a permanent magnet synchronous motor (PMSM) and a motor control system. The motor control system is configured to receive a torque command and determine whether the torque command can be satisfied based on a given voltage and a given maximum motor current limit. The motor control system is further configured to, responsive to determining that the torque command can be satisfied, determine a minimum current that satisfies the torque command. The motor control system is further configured to send the minimum current as a minimum current command to the PMSM.

According to one or more embodiments, a method includes receiving, by a processing device, a torque command and a voltage. The method further includes determining, by the processing device, a current command based on the torque command and the voltage. The method further includes estimating, by the processing device, a machine current based on the current command. The method further includes determining, by the processing device, whether the machine current is less than a maximum machine current threshold. The method further includes responsive to determining that the machine current is not greater than the maximum machine current threshold, sending the machine current as a minimum current command to a permanent magnet synchronous motor (PMSM).

According to one or more embodiments, motor control system is configured to determine whether a torque command can be satisfied based on a given voltage and a given maximum motor current limit. The motor control system is further configured to, responsive to determining that the torque command cannot be satisfied, iteratively modify the torque command until the torque command can be satisfied. The motor control system is further configured to responsive to determining that the modified torque command can be satisfied, determine a minimum current that satisfies the torque command.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
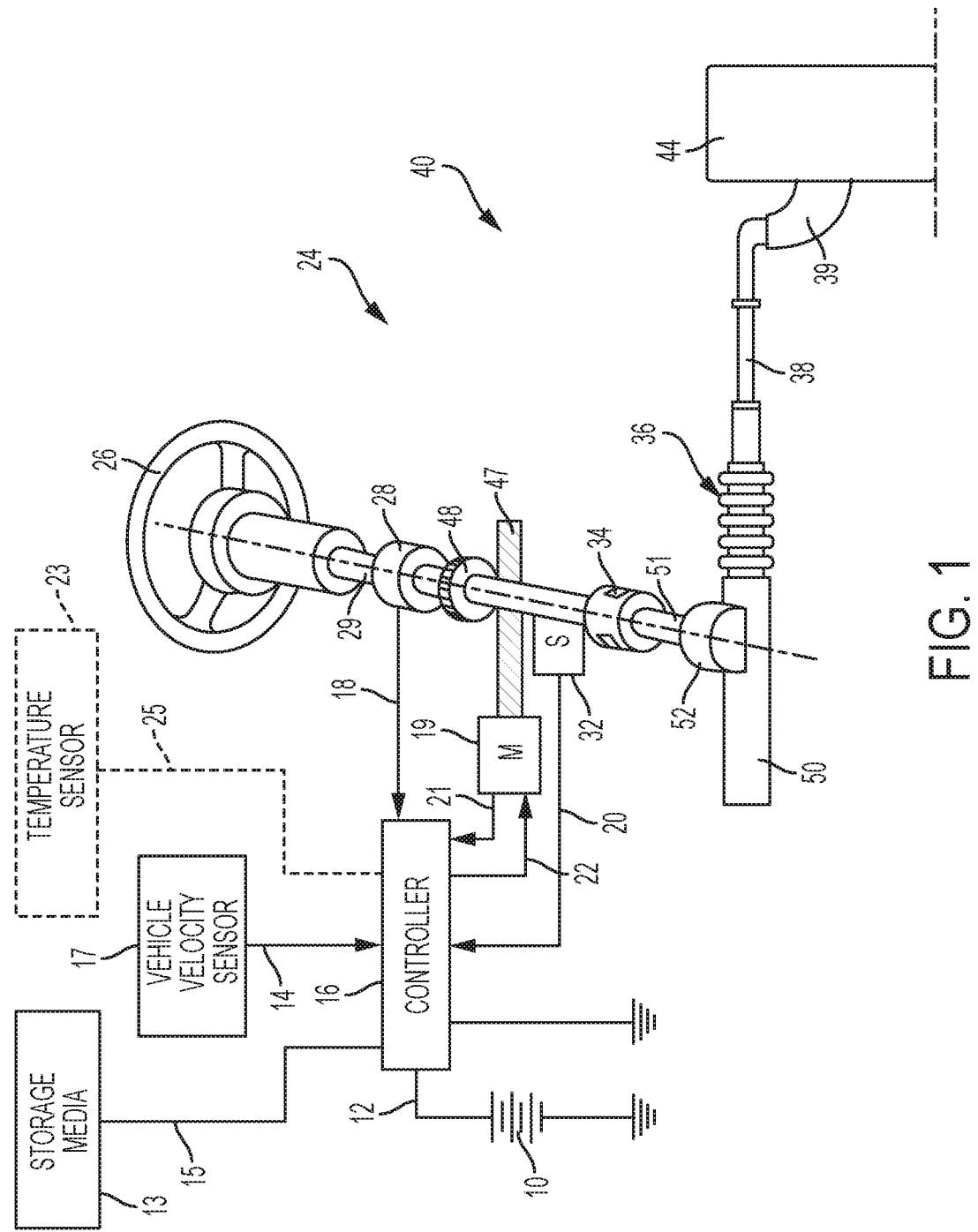
FIG. 1 depicts a block diagram of an exemplary embodiment of an electric power steering system according to aspects of the present disclosure.

Referring now to the figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like), is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 19, which could be a permanent magnet synchronous motor (PMSM), and is hereinafter denoted as motor 19. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position θ as measured by a position sensor 32 over a prescribed time interval. For example, motor speed $\omega_m$ may be determined as the derivative of the motor position θ from the equation $\omega_m = \Delta\theta/\Delta t$ where Δt is the sampling time and Δθ is the change in position during the sampling interval. Alternatively, motor velocity may be derived from motor position as the rate of change of position with respect to time. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 19 and the desired torque, the position and/or speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the foregoing. The position encoder outputs a position signal 20 indicating the angular position of the steering shaft 51 and thereby, that of the motor 19.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time-based compensation and filtering may be employed to eliminate noise or avoid undesirable spectral characteristics.

In order to perform the prescribed functions and desired processing, as well as the computations therefor (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

Permanent Magnet Synchronous Machines (PMSMs) are gaining more attention in electric drive applications due to their advantages such as high power density, easy controllability, and improved reliability. One commonly implemented control technique for PMSMs is vector control, in which all AC signals are transformed into DC signals via a reference frame transformation. The control system is then implemented in the synchronously rotating or d/q reference frame.

Torque control of PMSMs requires online determination of machine d/q current commands for a given torque command, machine speed, and available supply voltage. Most existing techniques for current command generation fail to consider the machine current limit constraint. The maximum machine current limit is typically specified for protecting the power converters and associated electronic circuitry as well as the electrical machine.

According to aspects of the present disclosure, an online machine current management technique for optimal current trajectory computation considering the constraint of machine current limit in PMSM drives is described. The machine current limiting is translated to an equivalent PMSM torque limiting problem and is implemented by online iterative torque command modification. The limiting technique described herein successfully restricts the machine current to the defined limit while preserving the typical maximum torque per ampere (MTPA) as well maximum torque per voltage (MTPV) operation. The proposed technique is applicable to all electric drive systems employing PMSMs and is not restricted to any specific application.

Figure 2:
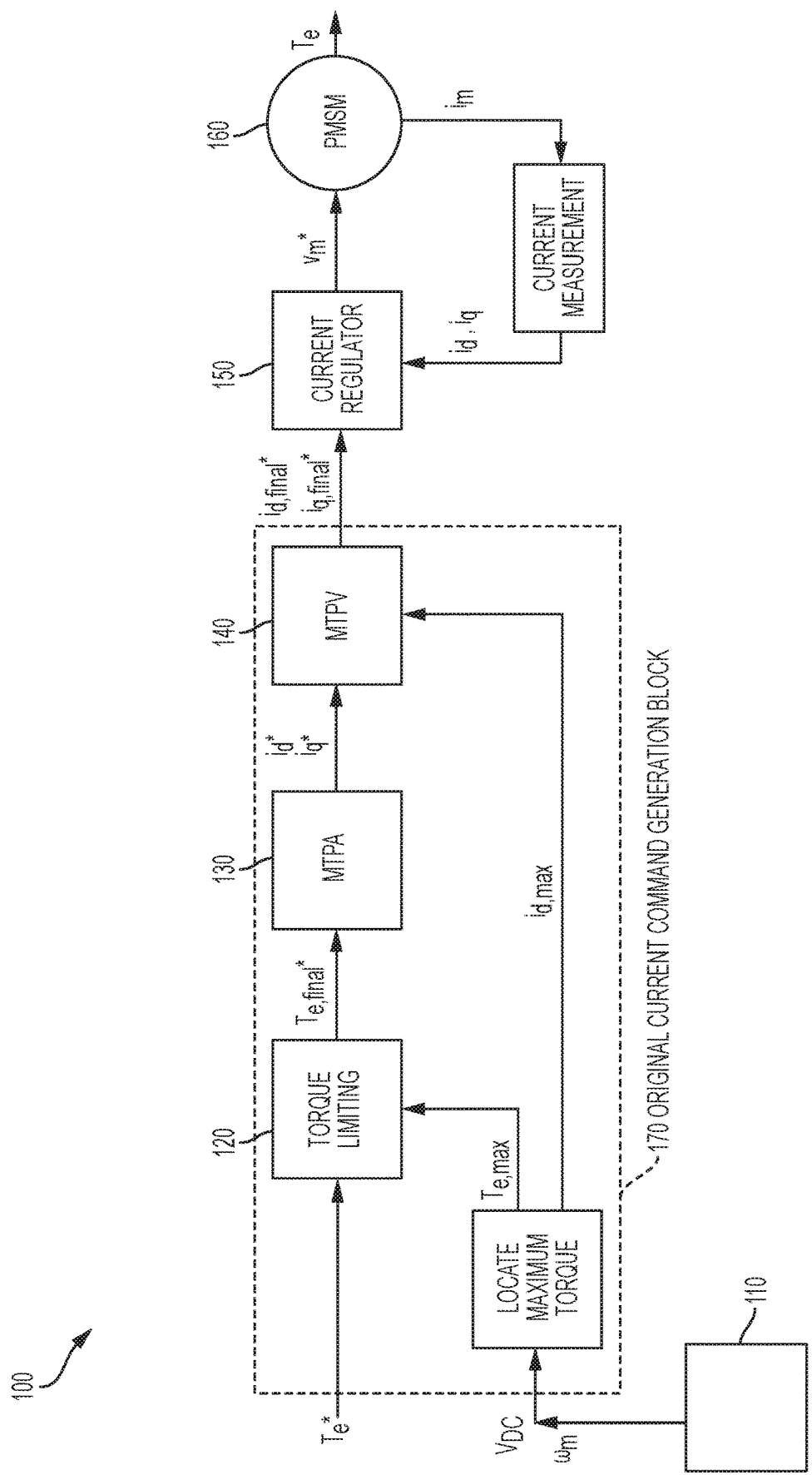
FIG. 2 depicts a block diagram of an example torque control algorithm for a PMSM.

FIG. 2 depicts a block diagram of an example torque control algorithm for a PMSM 160. The block diagram depicts a motor control system 100 in which for a given DC link voltage $V_{DC}$, which is derived from a battery 110, and a motor (mechanical) speed $\omega_m$, the maximum torque $T_{e,max}$ is calculated and then compared to a given torque command $T_e^*$ to generate a final torque command $T_{e,final}^*$ within the system capability by a torque limiting module 120. The motor control system 100 thus facilitates motor torque control and motor current control. The $T_{e,final}^*$ is sent to a maximum torque per ampere (MTPA) 130 to calculate current commands $i_d^*$ and $i_q^*$, which are sent into a maximum torque per voltage (MTPV) module 140 to check if the corresponding PMSM voltage $V_m$ exceeds the maximum feasible value $v_{m,max}$ limited by DC link voltage. If the PMSM voltage $v_m$ does not exceed $v_{m,max}$, current commands calculated by the MTPA module 130 are used as final commands $i_{d,final}^*$ and $i_{q,final}^*$ for PMSM control; otherwise, different commands $i_{d,final}^*$ and $i_{q,final}^*$ are generated by the MTPV block 140 to meet the PMSM voltage constraint. The final current commands are then sent to a current regulator 150, which ensures current tracking, and thus torque tracking. Here, 'tracking' refers to how close the output current (or torque) is to the desired current (or torque) as requested by the current command (torque command).

Machine current management is critical in a PMSM drive system such as the PMSM drive system 200 of FIG. 2. The machine current influences the total power loss and heat dissipation within the machine control system. In addition, if the machine current is higher than the power rating of the switching devices, it can result in power converter failures. Further, a control system in which the machine current is strictly controlled and maintained within defined limits can help in relaxing requirements for the power devices used in the inverter and the associated electronic components, ultimately leading to potential cost reduction.

The machine current management scheme presented herein ensures that the machine currents stay within defined limits, has the capability to ensure maximum torque or efficiency, is easy to implement online, and is accurate throughout the entire operation regions of the machine.

Figure 3A:
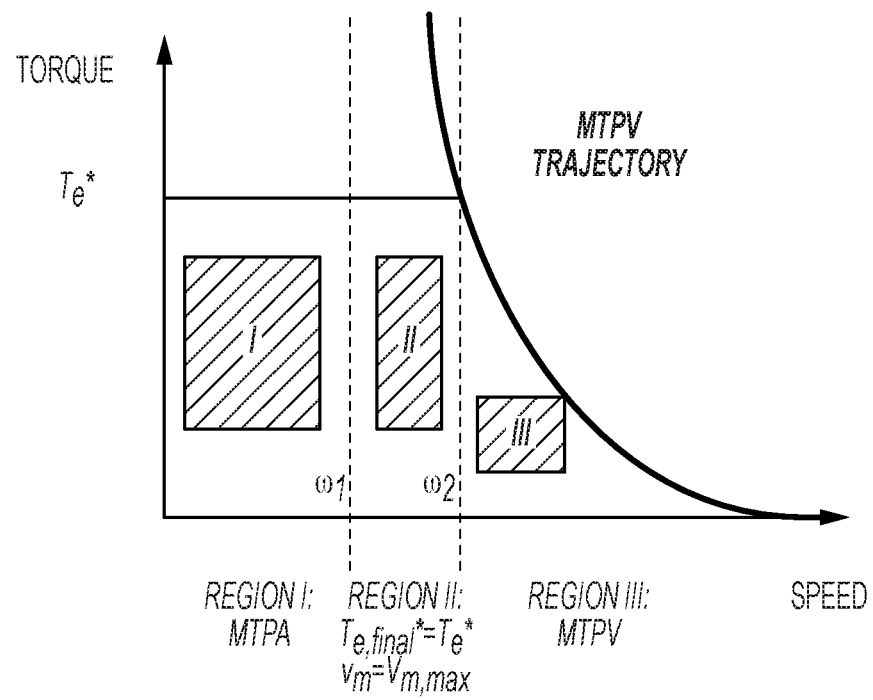
FIG. 3A depicts a PMSM operation trajectory analysis for PMSM operation modes according to aspects of the present disclosure.
Figure 3B:
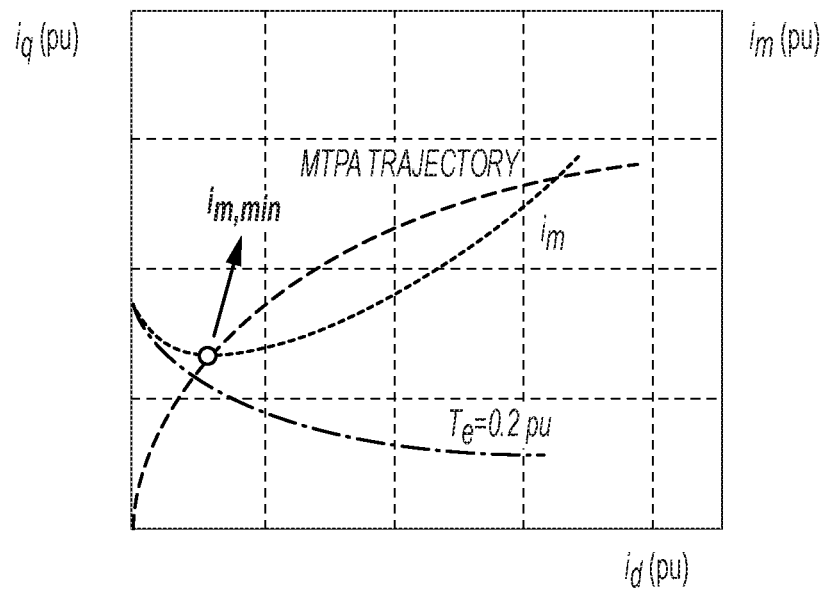
FIG. 3B depicts a PMSM operation trajectory analysis for MTPA trajectory according to aspects of the present disclosure.
Figure 3C:
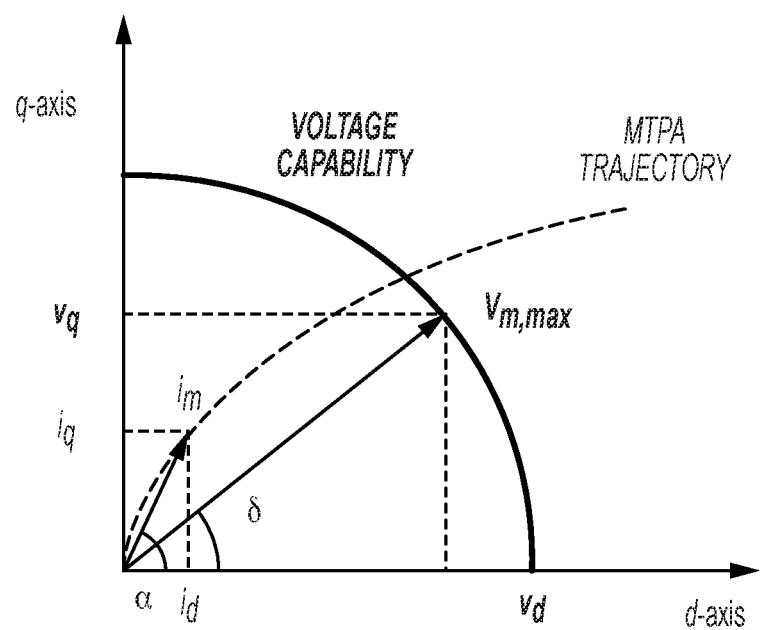
FIG. 3C depicts a PMSM operation trajectory analysis for MSM voltage capability according to aspects of the present disclosure.

A brief description of PMSM operation trajectory is presented herein, which reference to FIGS. 3A, 3B, and 3C. FIG. 3A depicts a PMSM operation trajectory analysis for PMSM operation modes according to aspects of the present disclosure. FIG. 3B depicts a PMSM operation trajectory analysis for MTPA trajectory according to aspects of the present disclosure. FIG. 3C depicts a PMSM operation trajectory analysis for PMSM voltage capability according to aspects of the present disclosure.

There are two operation regions in a PMSM drive system: MTPA and MTPV, which are denoted as region I and Region III respectively in FIG. 3A. The current commands in these two different regions are generated with MTPA and MTPV techniques respectively, to achieve optimal current trajectory. The MTPA technique essentially computes the current commands $i_d^*$ and $i_q^*$ is such that the torque command $T_e^*$ is produced with the minimum total machine current to ensure minimum losses. The MTPV technique determines the current commands in the voltage saturated region, i.e., when the voltage command magnitude is equal to the DC link voltage or the machine is impedance limited, such that the current commands produce torque that is as close as possible to the requested torque command Both techniques utilize the analytical machine model with machine parameter estimates considering nonlinearities such as saturation and temperature variations, to determine the current commands online.

In some embodiments, a voltage command $V_R$ is generated using a motor control model for line-to-neutral voltage equations:

$$V_d = L_d \frac{dI_d}{dt} + RI_d + \frac{N_p}{2}\omega_m L_q I_q$$

$$V_q = L_q \frac{dI_q}{dt} + RI_q - \frac{N_p}{2}\omega_m L_d I_d + K_e \omega_m$$

$$T_e = \frac{3}{2}K_e I_q + \frac{3}{4}N_p(L_q - L_d)I_d I_q$$

where $V_d$ and $V_q$ are the d-axis and q-axis motor voltages (in Volts), respectively; $I_d$ and $I_q$ are the d-axis and q-axis motor currents (in Amperes), respectively; $L_d$ and $L_q$ are the d-axis and q-axis motor inductances (in Henries), respectively; R is the motor circuit (i.e., the motor and controller) resistance (in Ohms), $K_e$ is the motor BEMF coefficient (in Volts/rad/s); $\omega_m$ is the mechanical motor velocity in (in rad/s); $N_p$ is the number of poles of the motor 20; and $T_e$ is the electromagnetic motor torque (in Nm).

It is to be noted that the equation for computing the electromagnetic motor torque $T_e$ is nonlinear and represents a sum of the torque developed by leveraging the magnetic field from the permanent magnets and the reluctance torque generated by the rotor saliency (i.e., a difference between $L_q$ and $L_d$) and desired values for $I_d$ and $I_q$. A reference model design for optimizing selection of the reference currents $I_d$ and $I_q$ to use for PMSM control is described in U.S. Pat. No. 9,531,311, entitled "Generation of a Current Reference to Control a Brushless Motor," filed Nov. 26, 2013, and issued Dec. 27, 2016, which is incorporated herein by reference in its entirety.

The parameters in these equations can vary during normal operation of the motor 20—potentially over 100% variation in R, and 5-20% variation in inductances $L_d$ and $L_q$ and 15-20% in $K_e$. R varies with the build and the temperature of the motor 20. $L_d$ and $L_q$ vary due to saturation (i.e., as a function of $I_d$ and $I_q$) and $K_e$ varies due to saturation (as a function of $I_q$) and with the temperature.

Besides Region I and III, there is also a transition region in between, denoted as region II in FIG. 3A, where $T_{e,final}$*=T; and $V_m=V_{m,max}$. Flux-weakening is performed in this region (i.e., region II) to keep the machine voltage within $V_{m,max}$ while the final torque command is kept the same as original.

Figure 4:
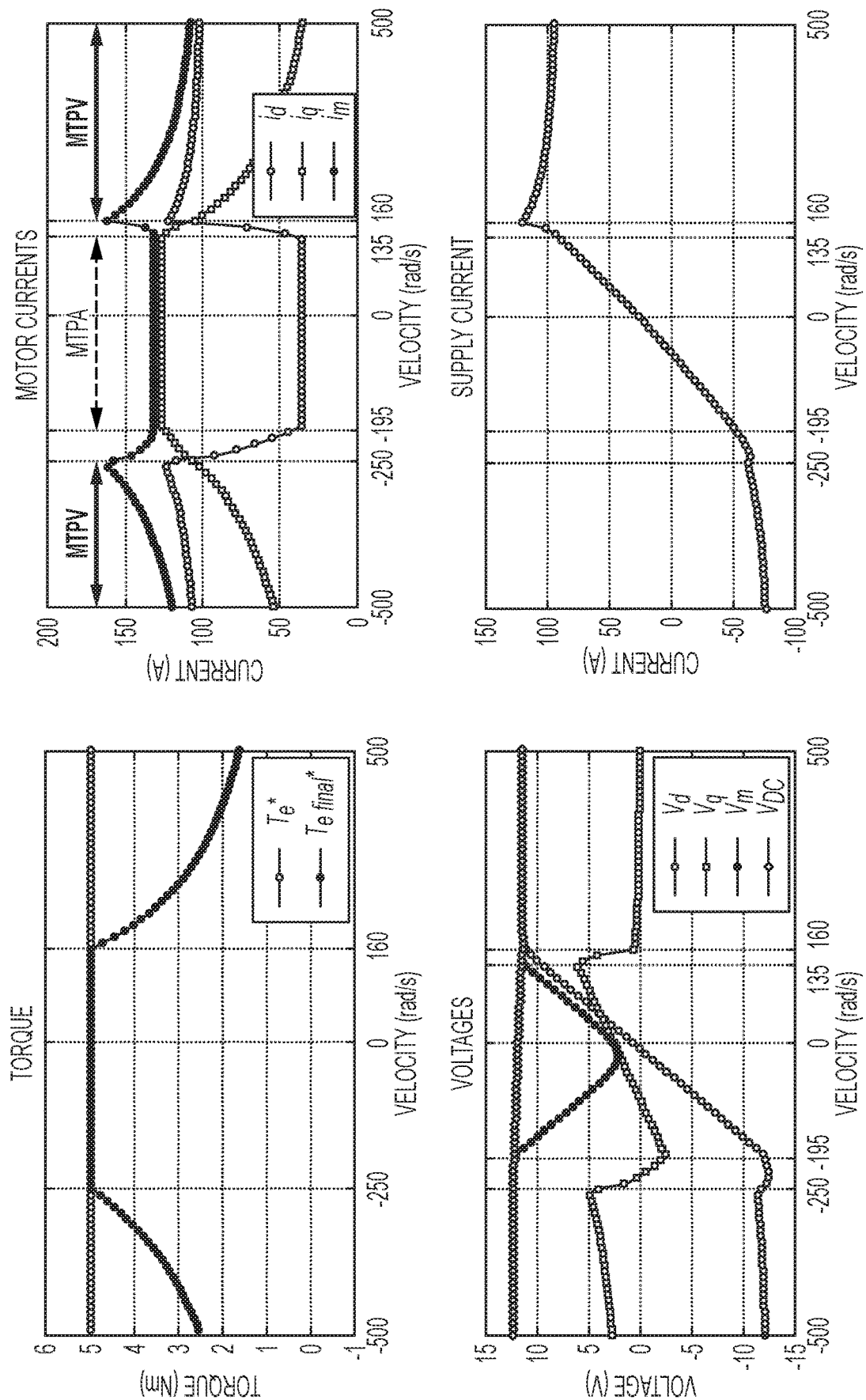
FIG. 4 depicts waveforms of torque, motor currents, voltages, and supply current in a salient PMSM drive according to aspects of the present disclosure.

The MTPA trajectory is shown in FIG. 3B. As shown, for a given torque command, e.g., $T_e$=0.2 pu, there are infinite current combinations that satisfy the torque command. However, there is one unique point where the final machine current $i_m$ is the minimum, i.e. MTPA operation point under this torque command Connecting all MTPA operation points under various torque commands results in a continuous MTPA trajectory. MTPA operation is highly desired in a PMSM drive system because the torque command is tracked while the machine current is minimum which results in minimum losses. However, the MTPA operation finally is not always feasible due to the voltage limit constraint determined by DC-link voltage, as show in FIG. 3C. Beyond a certain speed, the torque command must be reduced using the MPTV algorithm to ensure maximum torque production utilizing the available voltage. Between the MTPA and MTPV regions, there is a region where flux-weakening is performed but the given torque requirement can still be met. Once the machine enters the MTPV operation region, the torque command cannot be tracked any more. Instead, a maximum possible torque $T_{e,max}$ within PMSM voltage capability is used to ensure optimal current trajectory. The waveforms in a salient pole PMSM machine are given in FIG. 4 to illustrate the different operation regions. It can be seen from FIG. 4 that MTPA and MTPV operation modes, under given torque command, are active in low and high speed, respectively. Particularly, FIG. 4 depicts waveforms of torque, motor currents, voltages, and supply current in a salient PMSM drive according to aspects of the present disclosure. In addition to MTPA and MTPV operation modes, there is a transition region in between, which is the same as the region II in FIG. 3A.

If a machine current limit $I_{m,max}$ is to be considered as PMSM control constraint in the original motor control algorithm of FIG. 2, the torque command must be modified accordingly. The challenge here is that the maximum allowable torque to prevent machine current exceeding its limit varies with operating conditions, and must therefore be computed online. To solve this problem, a torque command modification module combined with iterative updating technique is proposed here.

Figure 5:
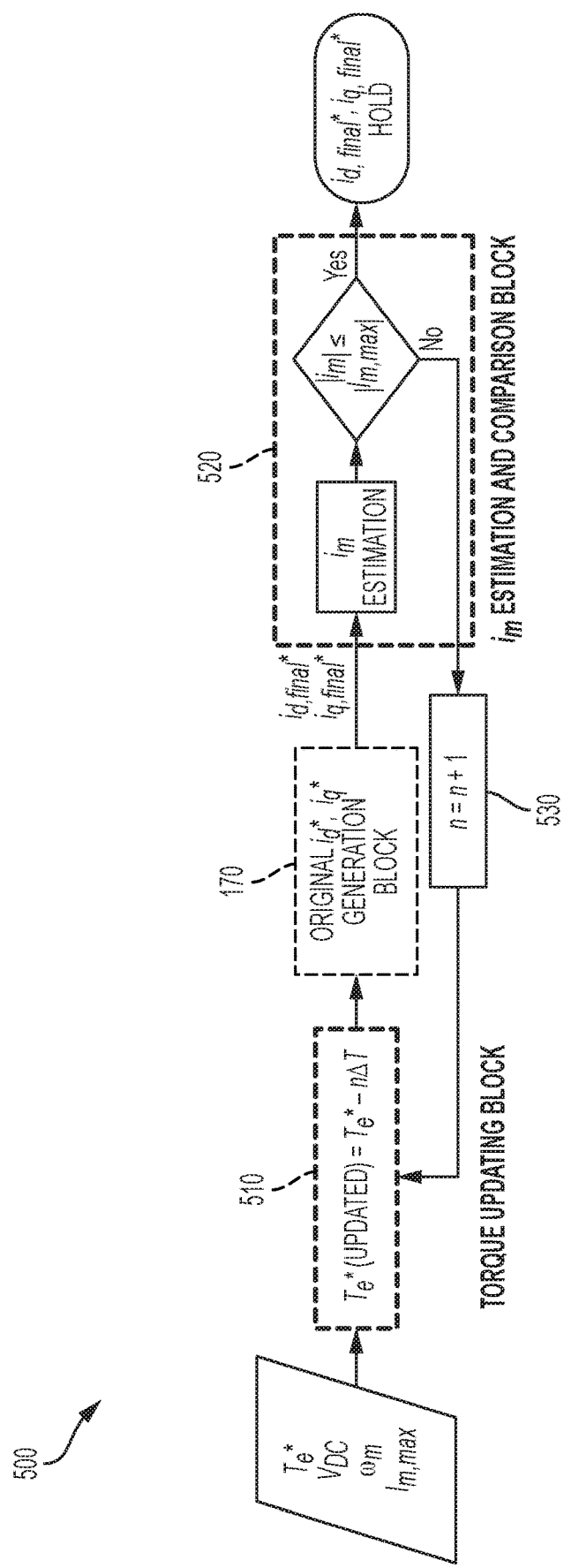
FIG. 5 depicts a flow diagram of the machine current management scheme considering maximum machine current limit for PMSM drives according to aspects of the present disclosure.

In particular, FIG. 5 depicts a flow diagram of the machine current management scheme 500 considering maximum machine current limit for PMSM drives according to aspects of the present disclosure. The machine current management scheme 500 in FIG. 5 can be implemented using the motor control system 100 of FIG. 2 and is combined with the original current command calculation algorithm of FIG. 2 (i.e., original current command generation block 170) to generate current commands $i_{d,final}$* and $i_{q,final}$* and ensure machine current under defined limit.

Specifically, the proposed scheme 500 is composed of two main blocks, i.e., torque updating block 510, and $i_m$ estimation and comparison block 520. The torque updating block 510 performs torque command modification. The $i_m$ estimation and comparison block 520 estimates the machine current $i_m$ based on current commands $I_{d,final}$* and $i_{q,final}$*, and examines if $i_m$ is within the limit value and feeds back (at feedback block 530) updating information to the previous torque updating block 510 until $i_m$ meets the defined limit. The n in the feedback block 530 represents the iteration number which contains the feedback information for updating the torque command, and ΔT is the torque updating factor.

There are multiple ways to specify the torque updating block 510 and feedback loop (e.g., feedback block 530). However, the underlying idea is the same, i.e., to limit $i_m$ within the given limit by torque command modification and iterative updating. In the embodiment shown in FIG. 5, the torque modification is achieved by using a torque updating block 510 and the iteration number via the feedback block 530. The torque command is continuously updated through feedback loop until machine current limit is met.

The developed scheme ensures optimal current trajectory tracking within the specified machine current limit. Whenever the original $i_m$ is higher than $I_{m,max}$, the proposed technique generates different $i_{d,final}$* and $i_{q,final}$* such that machine current limit is not exceeded.

Figure 6:
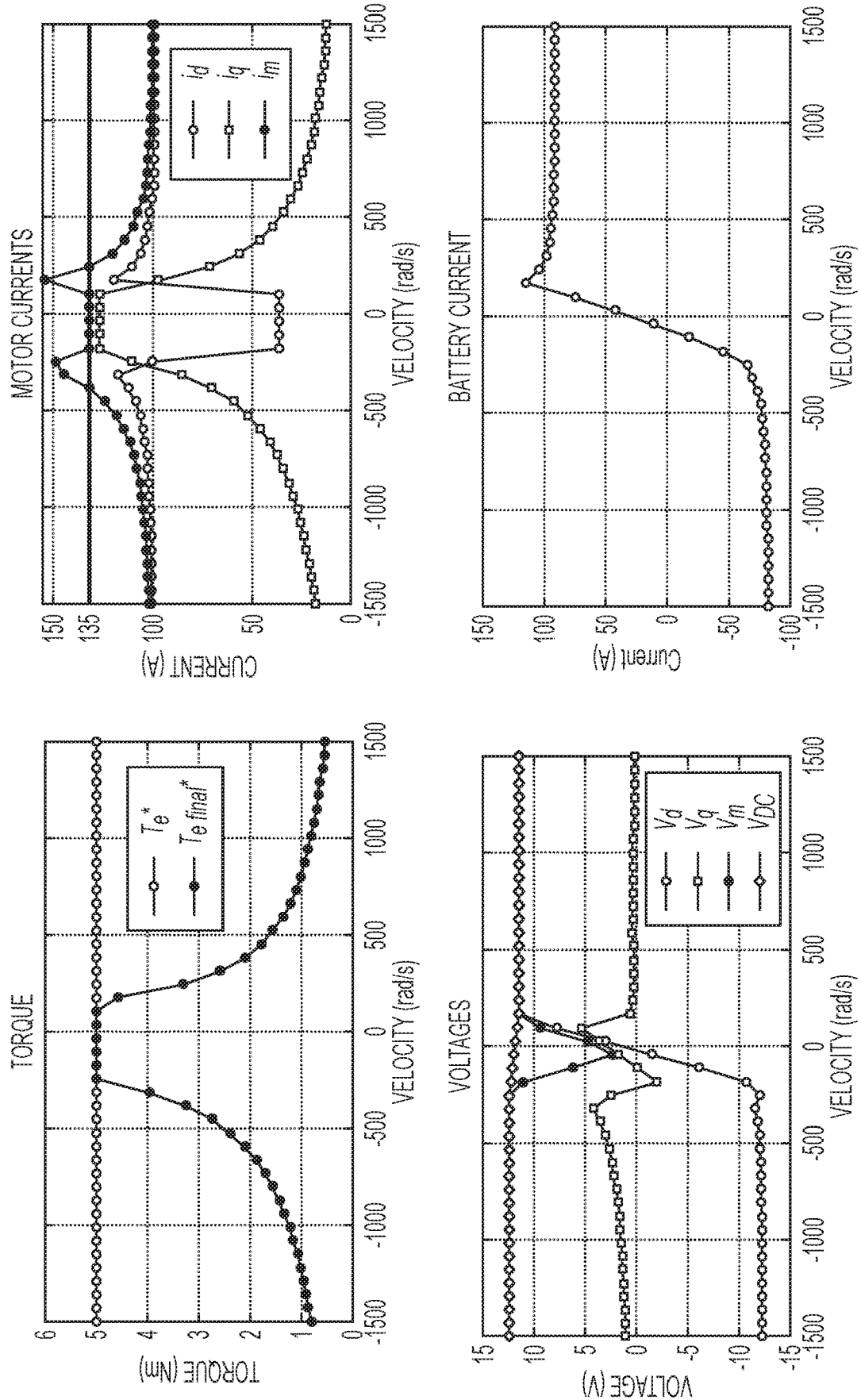
FIG. 6 depicts waveforms of torque, motor currents, voltages, and battery current of simulation results using traditional machine current management techniques.
Figure 7:
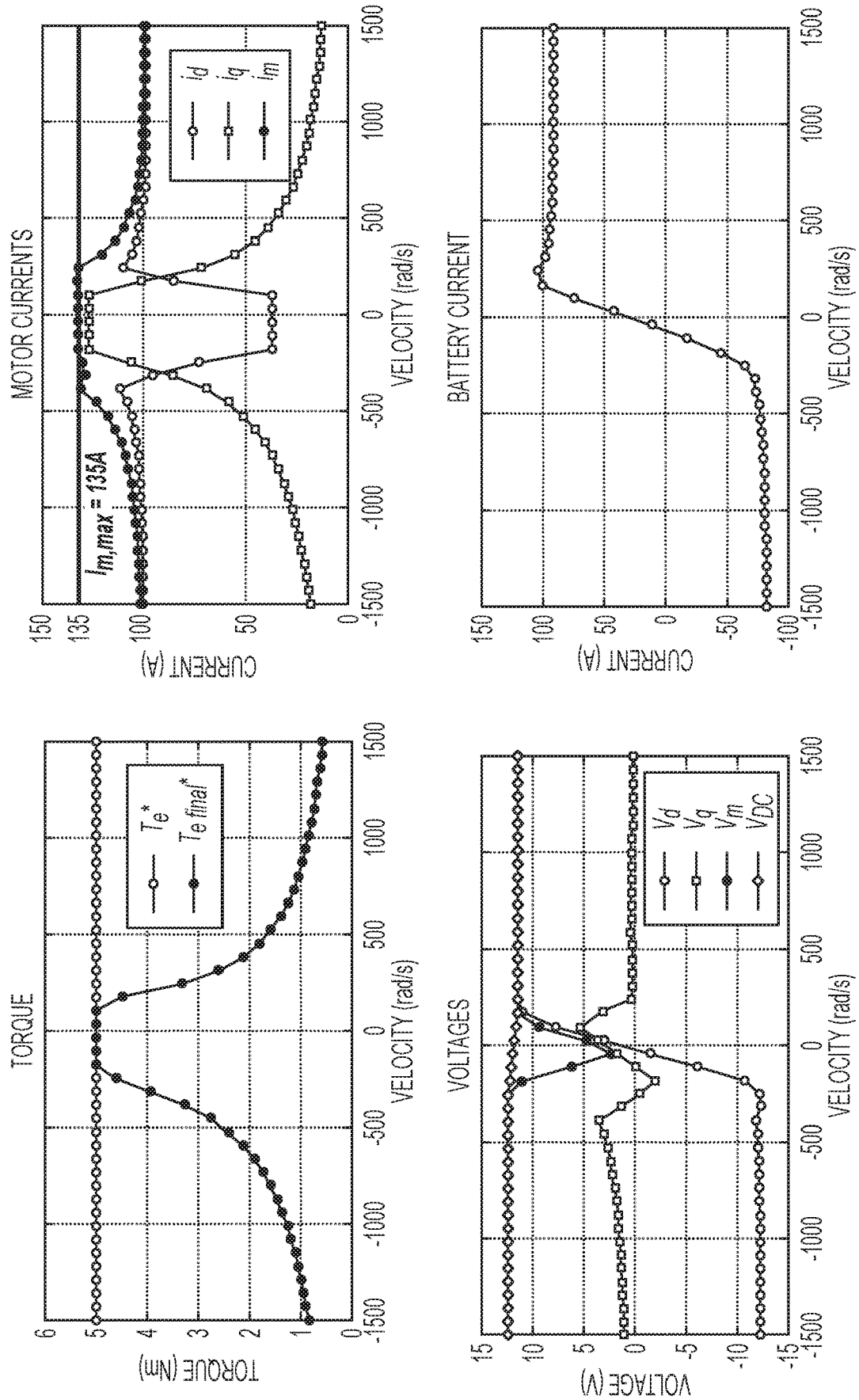
FIG. 7 depicts waveforms of torque, motor currents, voltages, and battery current of simulation results achieved by applying the machine current management techniques according to aspects of the present disclosure.

Simulation results without and with developed machine current management scheme are shown in FIGS. 6 and 7, respectively. In particular, FIG. 6 depicts waveforms of torque, motor currents, voltages, and battery current of simulation results using traditional machine current management techniques while FIG. 7 depicts waveforms of torque, motor currents, voltages, and battery current of simulation results achieved by applying the machine current management techniques according to aspects of the present disclosure.

It can be seen from FIG. 7 that machine current is successfully limited to the maximum value, which is set to $I_{m,max}$=135 A. Compared to the final torque command $T_{e,final}$* in FIG. 6 without developed machine current management scheme, the $T_{e,final}$* in FIG. 7 is modified to generate different current commands such that the given machine current limit constraint is met. The results demonstrate the effectiveness of the developed scheme for machine current limiting.

Figure 8:
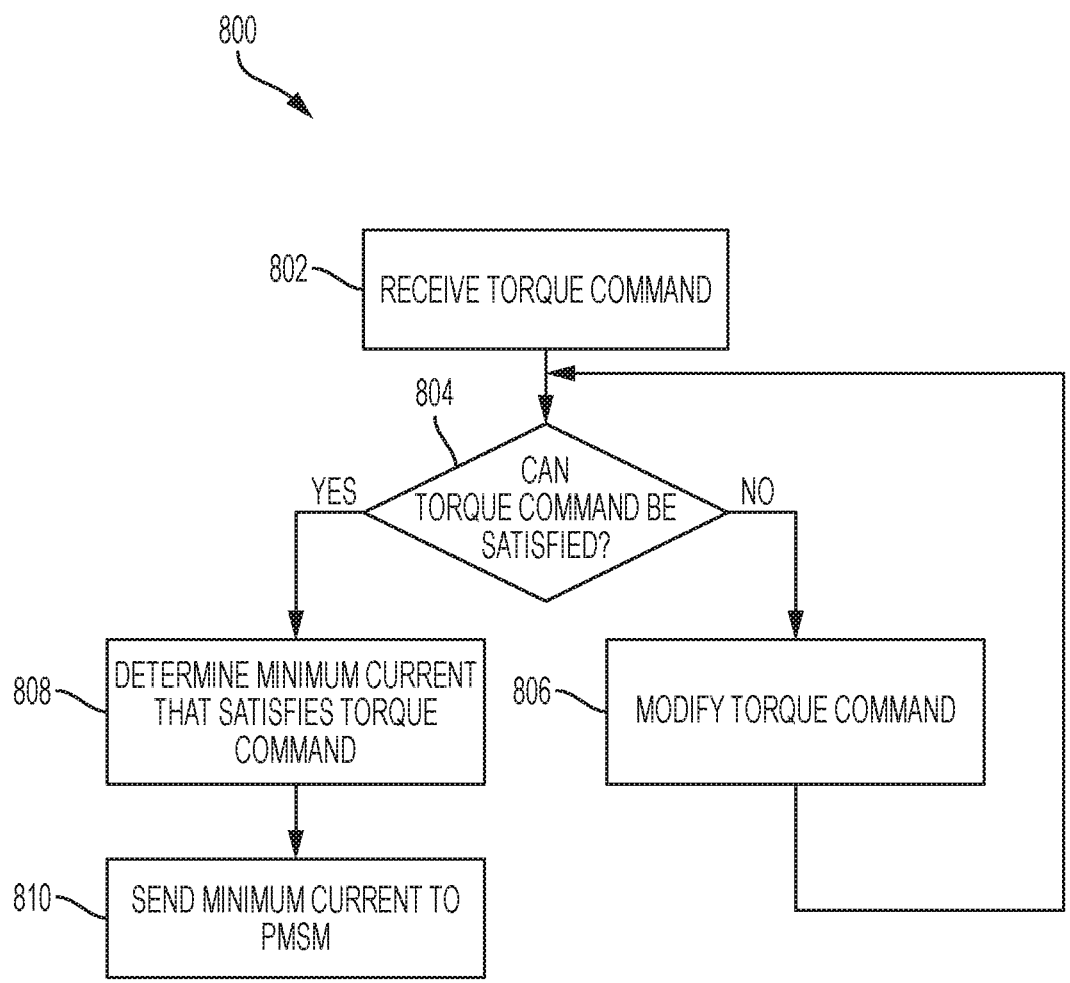
FIG. 8 depicts a flow diagram of a method for machine current limiting for permanent magnet synchronous machines according to aspects of the present disclosure.

As described herein, the proposed scheme is easy to implement online, is applicable for all types of PMSM machines, meets the current constraints under all operating conditions, and can be employed in drive system irrespective of the motion control application FIG. 8 depicts a flow diagram of a method 800 for machine current limiting for permanent magnet synchronous machines according to aspects of the present disclosure. The method 800 may be implemented in an EPS system 40 as depicted in FIG. 1, for example, or in any other suitable machine or system. FIG. 8 is now described with reference to elements from FIGS. 1 and/or 5.

At block 802, the motor control system 100 receives a torque command. At decision block 804, the motor control system 100 determines whether the torque command can be satisfied based on considerations of available voltage and a maximum motor current limit. If it is determined at decision block 804 that the torque command cannot be satisfied, the torque command is modified at block 806. The modification can iterate such that the torque command is incrementally modified. It can be determined at decision block 804 whether the modified torque command is satisfied. Determining whether the torque command can be satisfied at decision block 804 can include comparing an estimated machine current to a maximum machine current threshold.

Once it is determined at decision block 804 that the torque command can be satisfied, the motor control system 100 determines a minimum current that satisfies the torque command at block 808. At block 810, the minimum current is then sent to a PMSM (e.g., the PMSM 160) as a minimum current command to cause the PMSM to generate an amount of torque specified in the torque command (or modified torque command).

Additional processes also may be included, and it should be understood that the process depicted in FIG. 8 represents an illustration and that other processes may be added or existing processes may be removed, modified, or rearranged without departing from the scope and spirit of the present disclosure.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

What is claimed is:

1. A system comprising:
    a permanent magnet synchronous motor (PMSM); and
    a motor control system configured to:
    receive a torque command;
    determine whether the torque command can be satisfied based on a given voltage and a given maximum motor current limit;
    responsive to determining that the torque command can be satisfied, determine a minimum current that satisfies the torque command, wherein determining whether the torque command can be satisfied comprises comparing an estimated machine current to a maximum machine current threshold; and
    send the minimum current as a minimum current command to the PMSM.

2. The system of claim 1, wherein the motor control system is further configured to:
    responsive to determining that the torque command cannot be satisfied, modify the torque command.

3. The system of claim 2, wherein the motor control system is further configured to:
    determine a minimum current that satisfies the modified torque command.

4. The system of claim 3, wherein the motor control system is further configured to:
    send the minimum current as a minimum current command to the PMSM to cause the PMSM to generate an amount of torque specified in the modified torque command.

5. The system of claim 1, wherein the motor control system is further configured to:
    responsive to determining that the torque command cannot be satisfied, iteratively modify the torque command until the torque command can be satisfied.

6. The system of claim 5, wherein iteratively modifying the torque command comprises reducing the torque command based on a torque updating factor $\Delta T$ and a an iteration number n.

7. The system of claim 1, wherein the motor control system is further configured to:
    determine a current command based on the torque command and the voltage.

8. The system of claim 7, wherein the motor control system is further configured to estimate the estimated machine current based on the current command.

9. The system of claim 7, wherein the motor control system is further configured to determine the current command by:
    performing a torque limiting operation on the torque command;
    performing a maximum torque per ampere operation; and
    performing a maximum torque per voltage operation.

10. A method comprising:
    receiving, by a processing device, a torque command and a voltage;
    determining, by the processing device, a current command based on the torque command and the voltage;
    estimating, by the processing device, a machine current based on the current command;
    determining, by the processing device, whether the estimated machine current is less than a maximum machine current threshold;
    responsive to determining that the estimated machine current is not greater than the maximum machine current threshold, sending the machine current as a minimum current command to a permanent magnet synchronous motor (PMSM); and
    responsive to determining that the machine current is greater than the maximum machine current threshold, iteratively updating the torque command as a modified torque command until the machine current is not greater than the maximum machine current threshold.

11. The method of claim 10, further comprising:
    responsive to the updating, sending the machine current as a minimum current command to the PMSM to cause the PMSM to generate an amount of torque specified in the modified torque command.

12. The method of claim 10, wherein the current command comprises a d-axis current command and a q-axis current command.

13. The method of claim 10, wherein determining the current command based on the torque command and the voltage comprises:
    performing a torque limiting operation on the torque command;
    performing a maximum torque per ampere operation; and
    performing a maximum torque per voltage operation.

14. A motor control system configured to:
    determine whether a torque command can be satisfied based on a given voltage and a given maximum motor current limit;
    responsive to determining that the torque command cannot be satisfied, iteratively modify the torque command until the torque command can be satisfied; and
    responsive to determining that the modified torque command can be satisfied, determine a minimum current that satisfies the torque command, wherein determining whether the torque command can be satisfied comprises comparing an estimated machine current to a maximum machine current threshold.

15. The motor control system of claim 14 being further configured to:
   send the minimum current as a minimum current command to a permanent magnet synchronous motor (PMSM) to cause the PMSM to generate an amount of torque specified in the torque command.

16. The motor control system of claim 14, wherein iteratively modifying the torque command comprises reducing the torque command based on a torque updating factor $\Delta T$ and a an iteration number n.

17. The motor control system of claim 16, wherein the iteration number n is incremented during each iteration of the iteratively modifying.

\* \* \* \* \*